United States Patent
Mukaiyama et al.

(10) Patent No.: US 8,122,126 B2
(45) Date of Patent: Feb. 21, 2012

(54) DEVICE STATUS NOTIFICATION DEVICE

(75) Inventors: Masanori Mukaiyama, Minamiminowa-mura (JP); Hiromu Okada, Shiojiri (JP); Takahiro Shigeta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 12/581,720

(22) Filed: Oct. 19, 2009

(65) Prior Publication Data
US 2010/0106829 A1 Apr. 29, 2010

(30) Foreign Application Priority Data
Oct. 27, 2008 (JP) ................................. 2008-275228

(51) Int. Cl.
*G06F 15/173* (2006.01)
(52) U.S. Cl. ..................................................... 709/224
(58) Field of Classification Search .................... 709/223, 709/224, 227, 203
See application file for complete search history.

(56) References Cited

U.S. PATENT DOCUMENTS

| | | | | |
|---|---|---|---|---|
| 5,943,503 | A * | 8/1999 | Kai | 708/833 |
| 6,269,396 | B1 * | 7/2001 | Shah et al. | 709/223 |
| 6,363,411 | B1 * | 3/2002 | Dugan et al. | 709/202 |
| 6,363,421 | B2 * | 3/2002 | Barker et al. | 709/223 |
| 6,369,909 | B1 * | 4/2002 | Shima | 358/1.15 |
| 6,557,122 | B1 * | 4/2003 | Sugauchi et al. | 714/57 |
| 6,721,791 | B1 * | 4/2004 | Qiao | 709/224 |
| 6,734,985 | B1 * | 5/2004 | Ochiai | 358/1.15 |
| 6,940,615 | B1 * | 9/2005 | Shima | 358/1.15 |
| 7,177,043 | B2 * | 2/2007 | Qiao | 358/1.15 |
| 7,206,830 | B2 * | 4/2007 | Yamazaki | 709/223 |
| 7,325,054 | B2 * | 1/2008 | Ishimoto | 709/224 |
| 7,447,757 | B2 * | 11/2008 | Muto | 709/223 |
| 7,480,729 | B2 * | 1/2009 | Fujihara | 709/232 |
| 7,529,823 | B2 * | 5/2009 | Trufinescu et al. | 709/223 |
| 2002/0049837 | A1 * | 4/2002 | Kato | 709/223 |
| 2003/0030843 | A1 * | 2/2003 | Qiao | 358/1.15 |
| 2003/0229691 | A1 * | 12/2003 | Ishimoto | 709/223 |
| 2005/0021721 | A1 * | 1/2005 | Takahashi et al. | 709/223 |
| 2006/0191435 | A1 * | 8/2006 | Fujihara | 101/484 |
| 2006/0265473 | A1 * | 11/2006 | Muto | 709/218 |
| 2007/0079006 | A1 * | 4/2007 | Oya | 709/245 |

FOREIGN PATENT DOCUMENTS

| | | |
|---|---|---|
| JP | 2001-197059 | 7/2001 |
| JP | 2003-099342 | 4/2003 |
| JP | 2007-074490 | 3/2007 |

\* cited by examiner

*Primary Examiner* — Ario Etienne
*Assistant Examiner* — Sargon Nano
(74) *Attorney, Agent, or Firm* — DLA Piper LLP (US)

(57) ABSTRACT

There is provided a device status notification device that notifies a notification destination, which is connected to a network, of a status change in a device connected to the network through the network. The device status notification device includes a notification destination information table in which a notification destination, to which the status change in the device is notified in a case where there is the status change in the device, is registered, a notification destination validity checking unit that checks whether the notification destination registered in the notification destination information table exists with validity, and a registration deleting unit that deletes the notification destination, of which valid existence cannot be checked by the notification destination validity checking unit, from the notification destination information table.

6 Claims, 11 Drawing Sheets

| NOTIFICATION DESTINATION ADDRESS | NUMBER OF TIMES OF CHECKING |
|---|---|
| 111.222.3.1 | 0 |
| 111.222.3.2 | 2 |
|  |  |
|  |  |

DEVICE STATUS NOTIFICATION DEVICE

BACKGROUND

1. Technical Field

The present invention relates to a device, status notification device, and more particularly, a device status notification device that has a function for notifying a status change when the status of the device changes.

2. Related Art

A usage form in which one printer is shared by a plurality of host computers by interconnecting the printer and the plurality of host computers through a network has been widely used. In such a usage form, each host computer needs to monitor the start or end of a print operation, a failure of the printer, or the like, by monitoring the status change in the printer. In order to allow the host computers to monitor such status change, a device status notification device is arranged on the printer side.

For example, when the network specification for interconnecting the printer and the host computers is TCP/IP, the printer can be monitored by using an SNMP (Simple Network Management Protocol). In other words, a management application complying with the SNMP is mounted on the host computer side, and a network interface complying with the same SNMP is mounted on the printer side. Then, the host computers monitor the printer status by using monitoring means of an SNMP Trap.

In addition, for a case where the predetermined status change occurs on the printer side, which host computer a status change is notified to is registered in advance in a notification destination information table that is arranged on the printer side. However, generally, there is a limit to the number of notification destination addresses that can be registered in the notification destination information table. Accordingly, when there is no vacancy in the notification destination information table in a case where a host computer that tries newly to start monitoring the printer attempts to register its notification destination address in the notification destination information table of the printer, the registration thereof cannot be made. When a notification destination address cannot be registered in the notification destination information table, the corresponding host computer cannot monitor the printer status.

On the other hand, there are cases where a notification destination that has been registered in the notification destination information table in advance but is not used anymore exists as the notification destination stops operating or is disconnected from the network. When such a notification destination that does not exist with validity is registered in the notification destination information table, it is not only that a new notification destination cannot be registered, but also notification of the status change is continuously transmitted to the notification destination based on the registration in the notification destination information table. Accordingly, unnecessary packets flow on the network, whereby the network load is increased.

Accordingly, for example, in JP-A-2003-99342, a technique for deleting a notification destination from the notification destination information table based on a deletion request from a management application of the host computer has been disclosed. However, according to this technique, the notification destination is deleted based on the deletion request from the management application, and accordingly, the management is responsible for the host computer side. Therefore, in a case where the host computer leaves out of the network without issuing the deletion request for some reason, the notification destination remains in the notification destination information table.

In addition, for example, in JP-A-2001-197059, a technique for arranging an effective period in each notification destination registered in the notification destination information table has been disclosed. However, when this technique is used, the effective period must be managed for each notification destination in the notification destination information table, and accordingly, the management of the notification destination information table becomes complicated.

In addition, such a problem is not limited to the printer and may occur in various types of devices other than the printer as long as the devices are device status notification devices that notify a notification destination of the status change.

SUMMARY

An advantage of some aspects of the invention is that it provides a device status notification device that can delete a notification destination, which does not exist with validity, from the notification destination information table and does not require complicated management of the notification destination information table.

According to a first aspect of the invention, there is provided a device status notification device that notifies a notification destination, which is connected to a network, of a status change in a device connected to the network through the network. The device status notification device includes: a notification destination information table in which a notification destination, to which the status change in the device is notified in a case where there is the status change in the device, is registered, a notification destination validity checking unit that checks whether the notification destination registered in the notification destination information table exists with validity; and a registration deleting unit that deletes the notification destination, of which valid existence cannot be checked by the notification destination validity checking unit, from the notification destination information table.

In the above-described device status notification device, the notification destination validity checking unit may be configured to determine that the notification destination does not exist with validity in a case where the notification destination validity checking unit issues a reply request for requesting a reply to the notification destination registered in the notification destination information table and cannot acquire the reply for the reply request.

In the above-described device status notification device, the notification destination validity checking unit may be configured to check whether the notification destination registered in the notification destination information table exists with validity on a regular basis.

Alternatively, in the above-described device status notification device, the notification destination validity checking unit may be configured to check whether the notification destination registered in the notification destination information table exists with validity when notifying of the status change in the device.

In addition, in the above-described device status notification device, the notification destination validity checking unit may be configured to issue the reply request up to a regulated number of times to the notification destination in a case where the reply from the notification destination cannot be acquired for the issuing of the reply request and determine that the notification destination, from which the reply cannot be acquired for the issuing of the reply request exceeding the regulated number of times, does not exist with validity.

Alternatively, in the above-described device status notification device, it may be configured that the notification destination validity checking unit does not consecutively issue the next reply request and counts up the number of times of checking when the reply cannot be acquired after elapse of a predetermined time from issuing of the reply request to the notification destination, and the registration deleting unit deletes the notification destination from the notification destination information table in a case where the number of times of the checking exceeds a regulated number of times.

In addition, the device status notification device may be arranged in the device of which the status change is monitored.

Alternatively, the device status notification device may be a proxy server and be connected to the device of which the status change is monitored through the network.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. The embodiments described below are not the purpose of limiting the technical scope of the invention.

First Embodiment

Figure 1:
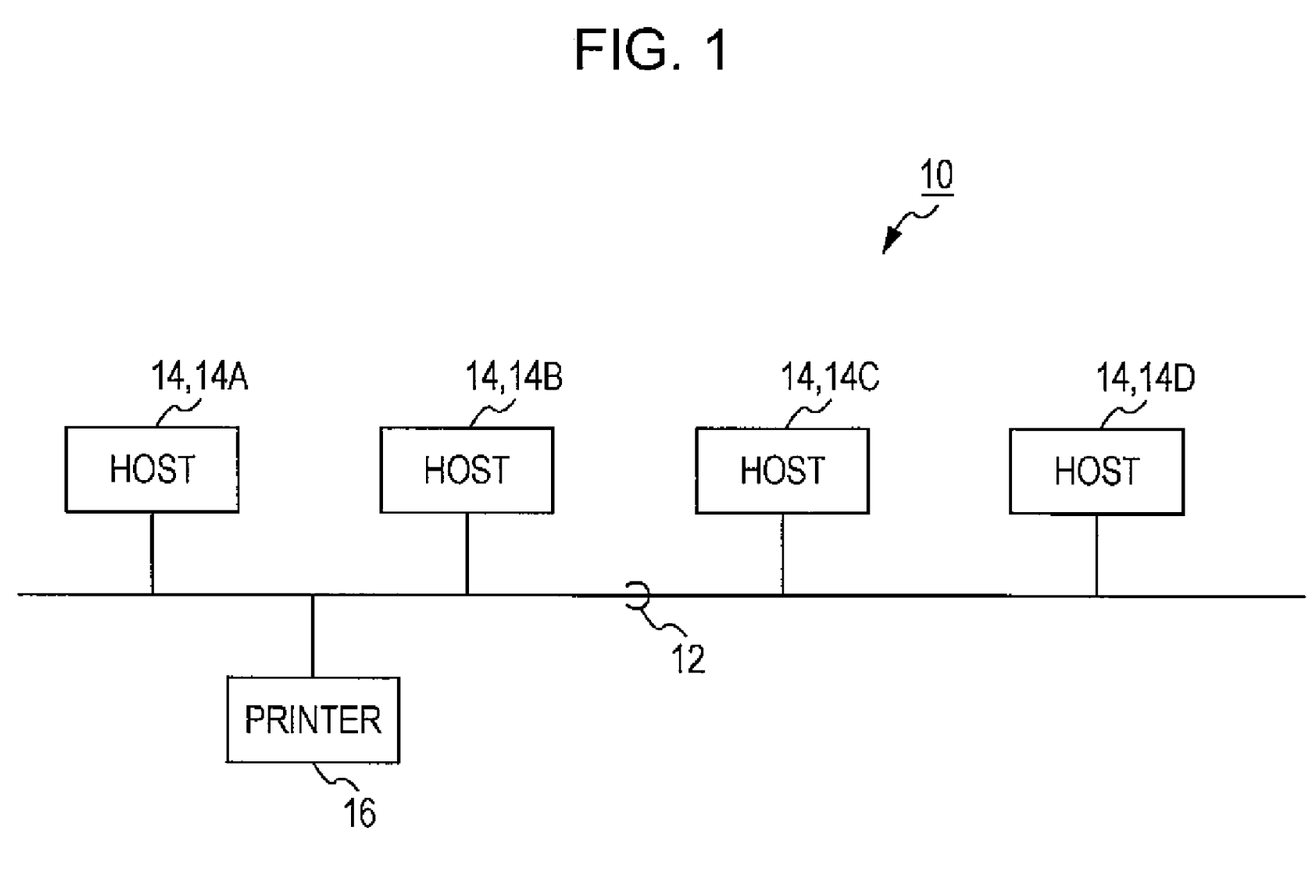
FIG. 1 is a block diagram showing an example of the network configuration of a device network system according to an embodiment of the invention.

FIG. 1 is a block diagram showing the entire configuration of a device network system 10 according to a first embodiment of the invention. As shown in FIG. 1, the device network system 10 according to this embodiment is configured to include one or a plurality of host computers 14 and one or a plurality of printers 16 that are connected to a network 12. In an example shown in FIG. 1, four host computers 14A to 14D are connected to the network 12, and one printer 16 is connected to the network 12.

According this embodiment, the network 12, for example, is in conformity with the TCP/IP specifications, and, the host computers 14 and the printer 16 that are in conformity with the same TCP/IP specifications are connected to the network 12. The host computer 14 monitors the status of the printer 16 by using the SNMP Trap. In order to perform the monitoring, a management application operates in the host computer 14.

This management application, for example, monitors start of printing of print data that has been transmitted to the printer 16, end of the printing, occurrence of out-of-paper error, occurrence of out-of-toner error, and the like by using the SNMP Trap. When such a status that is designated occurs in advance, the printer 16 notifies the management application of the designated host computer 14 of the status by using the SNMP Trap. In other words, the printer 16 transmits notification of the occurrence of the status to a notification destination address. The printer 16 is an example of a device, the status of which is monitored.

Figure 2:
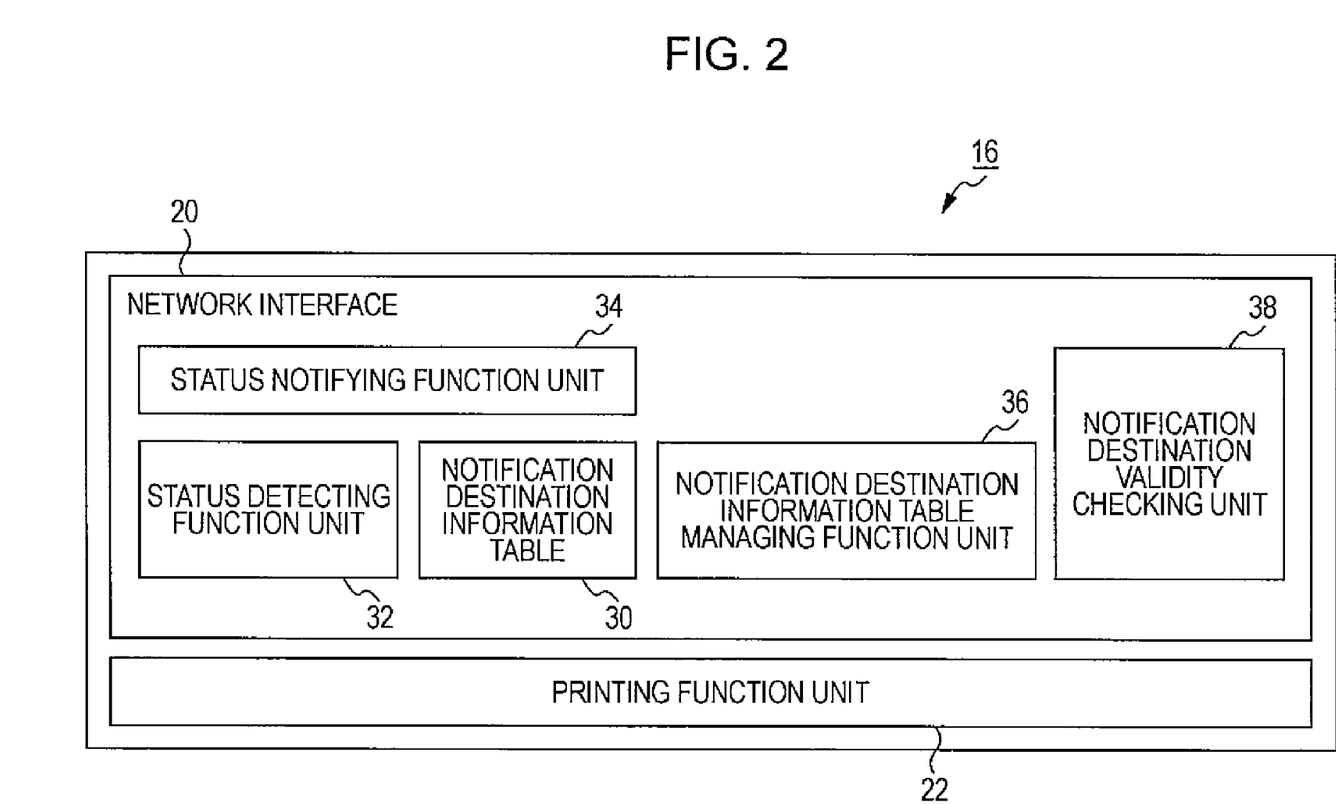
FIG. 2 is a functional block diagram showing an example of the internal configuration of a printer according to an embodiment of the invention.

FIG. 2 is a block diagram showing an example of the internal configuration of the printer 16 according to this embodiment. As shown in FIG. 2, the printer 16 according to this embodiment is configured to include a network interface 20 and a printing function unit 22. The network interface 20 is an interface that is used for connecting the printer 16 to the network 12. This network interface 20 corresponds to a device status notification device according to an embodiment of the invention. In addition, the printing function unit 22 is a functional unit for performing a printing operation in the printer 16 and performs a printing operation based on the print data received from the network interface 20.

In this embodiment, the network interface 20 includes a notification destination information table 30, a status detecting function unit 32, a status notifying function unit 34, a notification destination information table managing function unit 36, and a notification destination validity checking function unit 38. The notification destination information table 30 is formed in a non-volatile memory device such as an EEPROM that can be rewritten. Thus, even when the power of the printer 16 is turned off, the contents of the notification destination information table 30 is configured to be maintained.

Each of the status detecting function unit 32, the status notifying function unit 34, the notification destination information table managing function unit 36, and the notification destination validity checking function unit 38 can be implemented in software or hardware. For example, when each of the above-described function units is to be implemented in software, the CPU reads in and executes a program for implementing the function of the corresponding function unit, whereby the unit can be implemented. On the other hand, when each of the function units are to be implemented in hardware, it can be implemented by installing an ASIC (Application Specific IC) that is designed for realizing the function of the corresponding function unit. Furthermore, each of the function units can be implemented in software and hardware working in cooperation with each other.

In particular, the notification destination information table 30 is a table in which information on the notification destinations to which notification of a status change is transmitted in a case where the preset status change occurs in the printer 16 is maintained. The status detecting function unit 32 is a function unit that is used for detecting a status change of the printer 16 by using various programs and sensors. In addition, the status notifying function unit 34 is a function unit that is used for notifying the host computer 14 of the status change by using the SNMP Trap in a case where the preset status change is detected by the status detecting function unit 32. The notification destination address to be notified of is acquired by searching the notification destination information table 30 by using the status notifying function unit 34.

The notification destination information managing function unit 36 registers a new notification destination in the notification destination information table 30 or deletes a notification destination that has been already registered based on a request or a direction from the host computer 14. The notification destination validity checking function unit 38 checks the validity of the notification destination registered in the notification destination information table 30. When the notification destination does not exist with validity, the notification destination validity checking function unit 38 deletes the notification destination from the notification destination information table 30.

Figure 3:
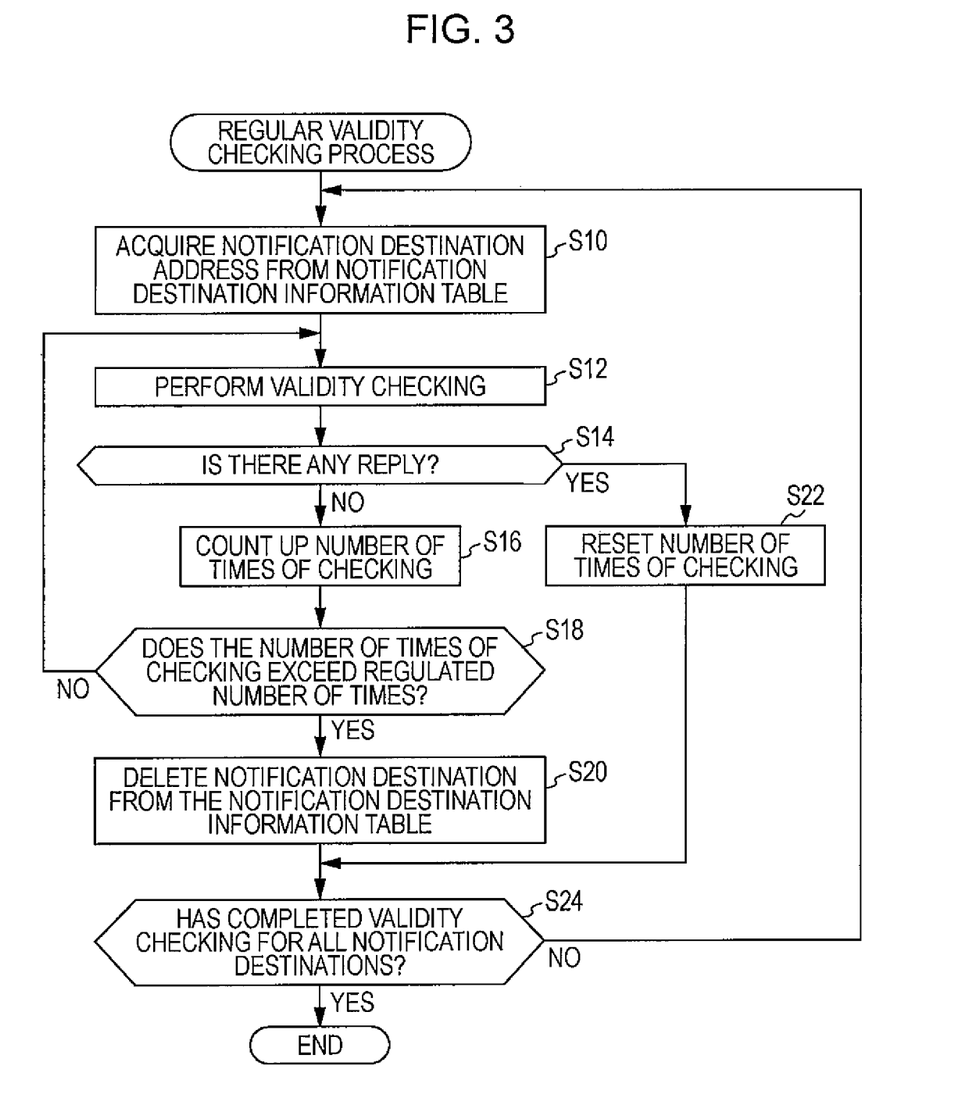
FIG. 3 is a flowchart showing an example of the contents of a regular validity checking process that is performed by a printer according to a first embodiment of the invention.

Next, the process that is performed by the notification destination validity checking function unit 38 will be described in detail with reference to FIG. 3. FIG. 3 is a diagram showing the contents of a regular validity checking process that is performed by the notification destination validity checking function unit 38. This regular validity checking process is a process that is operated at predetermined time intervals on a regular basis. According to this embodiment, the regular validity checking process, for example, is operated at the interval of once per one hour or once per two hours.

Figure 4:
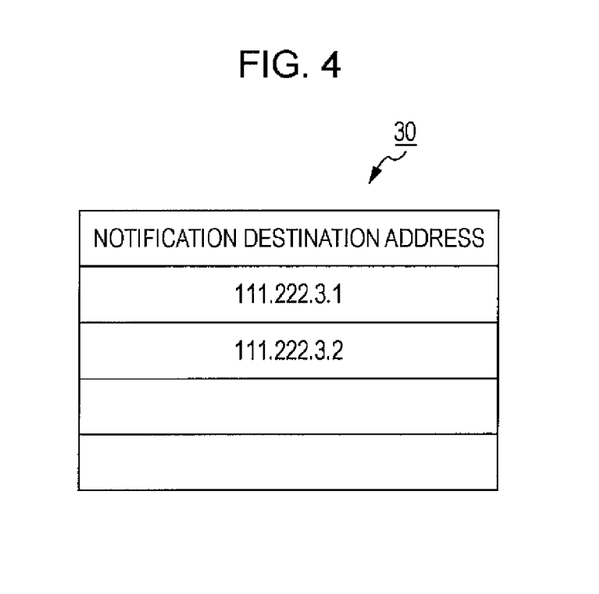
FIG. 4 is a diagram showing an example of the configuration of a notification destination information table that is maintained by the printer shown in FIG. 2.

As shown in FIG. 3, first, the notification destination validity checking function unit 38 acquires a notification destination address from the notification destination information table 30 (Step S10). FIG. 4 is a diagram showing an example of the internal configuration of the notification destination information table 30 according to this embodiment. As shown in FIG. 4, in the notification destination information table 30, notification destination addresses of the host computers 14 that are registered as notification destinations are stored. In this embodiment, a maximum of four notification destination addresses can be stored in the notification destination information table 30. In other words, only up to four notification destination addresses can be registered in the notification destination information table 30 according to this embodiment.

Next, as shown in FIG. 3, the notification destination validity checking function unit 38 performs validity checking (Step S12). In other words, the notification destination validity checking function unit 38 checks whether or not the host computer 14 having the notification destination address acquired in Step S10 exists with validity on the network 12 at the current time point.

Figure 5:
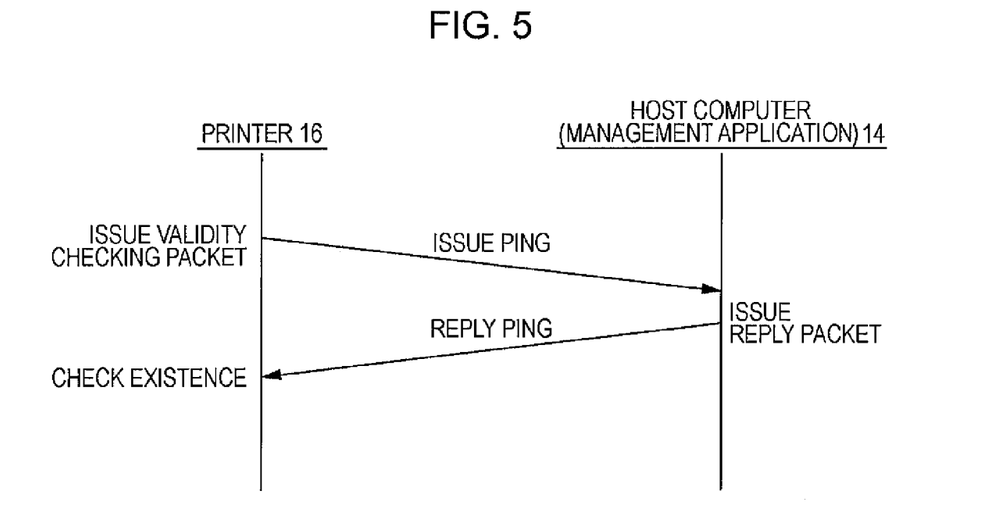
FIG. 5 is a diagram showing an example of exchange between the printer and a host computer in a case where the printer issues a Ping and acquires a reply for the Ping from the host computer in the regular validity checking process shown in FIG. 3.

For this validity checking, various techniques may be used. In this embodiment, as shown in FIG. 5, the validity is checked by issuing a Ping. In other words, the notification destination validity checking function unit 38 of the printer 16 issues a Ping to the notification destination address that is acquired in Step S10. The management application of the host computer 14 that has received this Ping sends back a reply for the Ping as a reply packet. Accordingly, the notification destination validity checking function unit 38 of the printer 16 determines whether the host computer 14 exists with validity based on whether the reply for the Ping is sent back within a predetermined time.

Accordingly, as shown in FIG. 3, the notification destination validity checking function unit 38 of the printer 16 determines whether a reply has been received from the host computer 14 within a predetermined time (Step S14). In particular, it is determined whether a reply for the Ping has been received from the host computer 14 until the time is out after the Ping was issued.

When the reply has not been received within the predetermined time (Step S14: NO), the notification destination validity checking function unit 38 counts up the number of times of checking by one (Step S16). The initial value of the number of times of the checking is set to zero. Then, when a Ping is issued once, the number of times is increased by one.

Next, the notification destination validity checking function unit 38 determines whether the number of times of the checking exceeds a regulated number of times (Step S18). For example, in this embodiment, the regulated number of times is set to three times. Accordingly, the notification destination validity checking function unit 38 determines whether or not the number of times that is counted up in Step S16 exceeds three times.

When the number of times of the checking is determined not to exceed three times (Step S18: NO), the notification destination validity checking function unit 38 proceeds back to the above-described Step S12 and performs validity checking again. On the other hand, when the number of times of the checking exceeds three times (Step S18: YES); in other words, when the number of times of the checking is four times, the notification destination validity checking function unit 38 deletes the notification destination from the notification destination information table 30 (Step S20). In other words, the notification destination address that is acquired in Step S10 is deleted from the notification destination information table 30.

Figure 6:
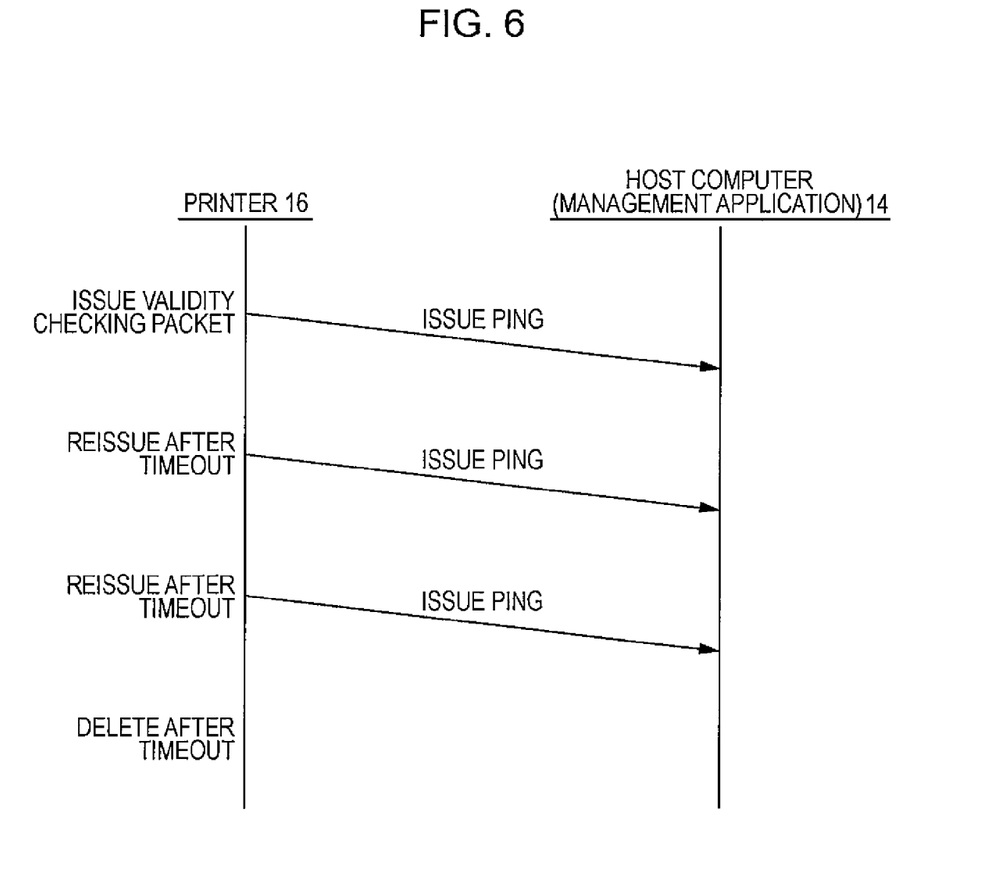
FIG. 6 a diagram showing an example of exchange between the printer and the host computer in a case where the printer issues a Ping and cannot acquire a reply for the Ping from the host computer in the regular validity checking process shown in FIG. 3.

FIG. 6 shows signal exchange between the printer 16 and the host computer 14 in a case where the notification destination validity checking function unit 38 of the printer 16 has not received a reply from the host computer 14 even when issuing a Ping three times. As shown in FIG. 6, when time is out after the first Ping is issued, the second Ping is issued. Then, when the time is out after the second Ping is issued, the third Ping is issued. However, when the time is out after the third Ping is issued, the notification destination validity checking function unit 38 deletes the notification destination address from the notification destination information table 30.

On the other hand, as shown in FIG. 3, when there is a reply from the host computer 14 in Step S14 (Step S14: YES), the notification destination validity checking function unit 38 resets the number of times of the checking to zero (Step S22).

After this Step S22 or the above-described Step S20, the notification destination validity checking function unit 38 determines whether validity of all the notification destinations registered in the notification destination information table 30 has been checked (Step S24). For example, in the example shown in FIG. 4, two notification destinations are registered in the notification destination information table 30, and accordingly, it is determined whether validity has been checked for the two notification destinations.

When checking for the validity of all the notification destinations that are registered in the notification destination information table 30 has not been completed (Step S24: NO), the process proceeds back to the above-described Step S10. Then, the notification destination address of the next notification destination is acquired from the notification destination information table 30, and validity of the next notification destination is checked. On the other hand, when checking for the validity of all the notification destinations that are registered in the notification destination information table 30 is completed (Step S24: YES), this regular validity checking process is completed.

In addition, the regular validity checking process shown in FIG. 3 may be configured to be started when the number of notification destinations registered in the notification destination information table 30 reaches the maximum number of notification destinations that can be stored in the notification destination information table 30.

As described above, according to the device network system 10 of this embodiment, the validity checking process is performed for the host computers 14 that are registered in the notification destination information table 30 on a regular basis, and the notification destination address of the host computer 14 from which any reply is not received is deleted from the notification destination information table 30. Accordingly, it can be avoided that the notification destination is maintained to be registered in the notification destination information table 30 despite that the notification destination does not exist with validity on the device network system 10. Therefore, by deleting the unnecessary notification destination from the notification destination information table 30, a case can be avoided as much as possible where there is no empty place in the notification destination information table 30 and registration cannot be made at a time when there is a registration request from a new host computer 14.

In addition, since unnecessary notification destinations are deleted from the notification destination information table 30, a packet of the SNMP Trap of which the notification destination does not exist can be configured not to flow on the network 12. Accordingly, unnecessary packets flowing on the network 12 can be reduced. In addition, a general application can be used as the management application of the host computer 14 without any modification, and accordingly, any change in the settings on the host computer 14 side is not required.

Second Embodiment

In the above-described first embodiment, the notification destination validity checking function unit 38 is configured to consecutively issue the next Ping after a predetermined time elapses (after time out) in a case where there is no reply after a Ping is issued. However, according to a second embodiment of the invention, a Ping is issued again when the next regular validity checking process is started. In other words, the Ping is not consecutively reissued, but the next Ping is issued after a predetermined time elapses. Hereinafter, a part that is different from that of the above-described first embodiment will be described.

Figure 7:
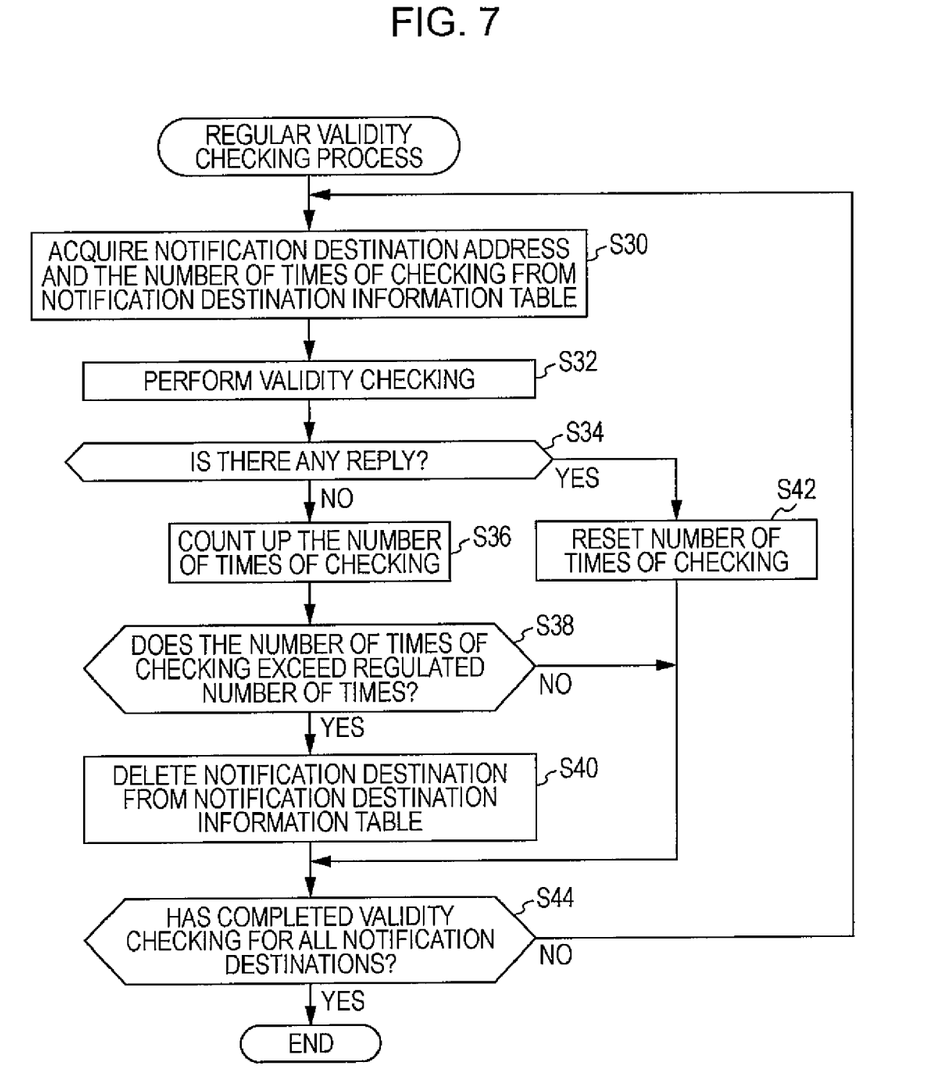
FIG. 7 is a flowchart showing an example of the contents of a regular validity checking process that is performed by a printer according to a second embodiment of the invention.

FIG. 7 is a flowchart showing the contents of a regular validity checking process that is performed by a notification destination validity checking function unit 38 according to this embodiment. FIG. 7 is a diagram corresponding to FIG. 3 of the above-described first embodiment. This regular validity checking process is a process that is operated at predetermined time intervals on a regular basis. Also in this embodiment, similarly to the above-described first embodiment; for example, the regular validity checking process is operated at the interval of once per one hour or once per two hours.

Figure 8:
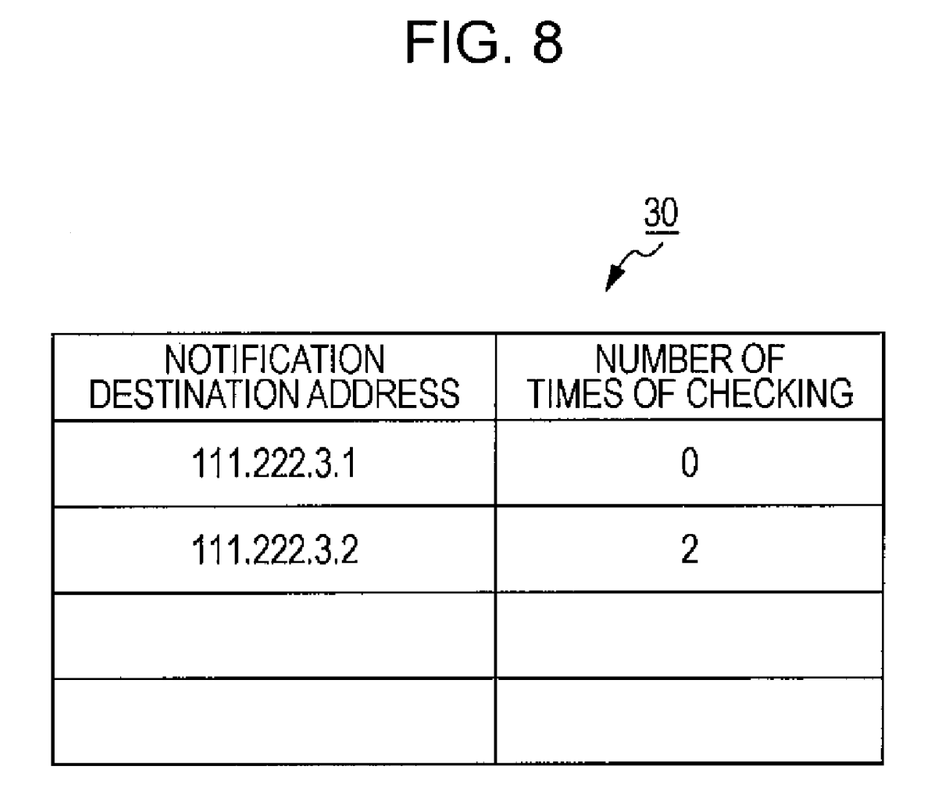
FIG. 8 is a diagram showing an example of the configuration of the notification destination information table that is maintained by the printer shown in FIG. 2.

As shown in FIG. 7, first, the notification destination validity checking function unit 38 acquires a notification destination address and the number of times of checking from a notification destination information table 30 (Step S30). FIG. 8 is a diagram showing an example of the internal configuration of the notification destination information table 30 according to this embodiment. As shown in FIG. 8, in the notification destination information table 30 according to this embodiment, the number of times of checking is stored in addition to each notification destination address of the host computer 14 that is registered as a notification destination. This number of times of checking indicates the number of times of cases where a reply is not returned when the validity checking for the corresponding notification destination address is performed. In addition, the number of times of checking is reset to zero when the existence of the notification destination is confirmed by performing the validity checking process.

Next, as shown in FIG. 7, the notification destination validity checking function unit 38 performs the validity checking process (Step S32). In other words, by using a technique similar to that of the first embodiment, the notification destination validity checking function unit 38 checks whether or not the host computer 14 having the notification destination address acquired in Step S30 exists on the network 12 with validity at the current time point.

Next, the notification destination validity checking function unit 38 of the printer 16 determines whether a reply has been received from the host computer 14 within a predetermined time (Step S34). In particular, the notification destination validity checking function unit 38 determines whether a reply for a Ping has been received from the host computer 14 until the time is out after the Ping was issued.

When the reply has not been received within the predetermined time (Step S34: NO), the notification destination validity checking function unit 38 counts up the number of times of checking by one and stores the number of times of checking after being counted up in the notification destination information table 30 (Step S36).

Next, the notification destination validity checking function unit 38 determines whether the number of times of the checking exceeds a regulated number of times (Step S38). For example, in this embodiment, the regulated number of times is set to three times. Accordingly, the notification destination validity checking function unit 38 determines whether or not the number of times that is counted up in Step S36 exceeds three times.

When the number of times of checking is determined to exceed three times (Step S38: YES), in other words, when the number of times of checking is four times, the notification destination validity checking function unit 38 deletes the notification destination from the notification destination information table 30 (Step S40). In other words, the notification destination address and the number of times of checking that are acquired in Step S30 are deleted from the notification destination information table 30.

On the other hand, when there has been a reply from the host computer 14 in Step S34 (Step S34: YES), the notification destination validity checking function unit 38 resets the corresponding number of times of checking to zero in the notification destination information table 30 (Step S42).

After this Step S42 or the above-described Step S40, when the number of times of the checking is determined not to exceed the regulated number of times in the above-described Step S38 (Step S38: NO), the notification destination validity checking function unit 38 determines whether validity of all the notification destinations registered in the notification destination information table 30 has been checked (Step S44). For example, in the example shown in FIG. 8, two notification destinations are registered in the notification destination information table 30, and accordingly, it is determined whether validity has been checked once for each of the two notification destinations.

When checking for the validity of all the notification destinations registered in the notification destination information table 30 has not been completed (Step S44: NO), the process proceeds back to the above-described Step S30. Then, the notification destination address of the next notification destination and the number of times of the checking are acquired from the notification destination information table 30, and validity of the next notification destination is checked. On the other hand, when checking for the validity of all the notification destinations registered in the notification destination information table 30 is completed (Step S44: YES), this regular validity checking process is completed.

In addition, the regular validity checking process shown in FIG. 7 may be configured to be started when the number of notification destinations registered in the notification destination information table 30 reaches the maximum number of notification destinations that can be stored in the notification destination information table 30.

As described above, also in the device network system 10 according to this embodiment, the validity checking process is performed for the host computers 14 that are registered in the notification destination information table 30 on a regular basis, and the notification destination address of the host computer 14 from which any reply is not received is deleted from the notification destination information table 30. Accordingly, it can be avoided that the notification destination is maintained to be registered in the notification destination information table 30 despite that the notification destination does not exist with validity on the device network system 10.

In addition, when the existence of the host computer 14 has not been checked due to the time out in Step S34, the next validity checking process is not performed consecutively, but the validity of the host computer 14 is checked by performing the next regular validity checking process. Accordingly, in a case where the host computer 14 merely cannot reply temporarily or the like for some reason or other, deletion of the registration thereof from the notification destination information table 30 can be avoided.

Third Embodiment

In the above-described first embodiment, the validity of the host computer 14 of the notification destination registered in the notification destination information table 30 is configured to be checked on a regular basis. However, according to a third embodiment of the invention, the validity is checked in accordance with a time when an SNMP Trap is issued to the notification destination. Hereinafter, a part that is different from that of the above-described first embodiment will be described.

Figure 9:
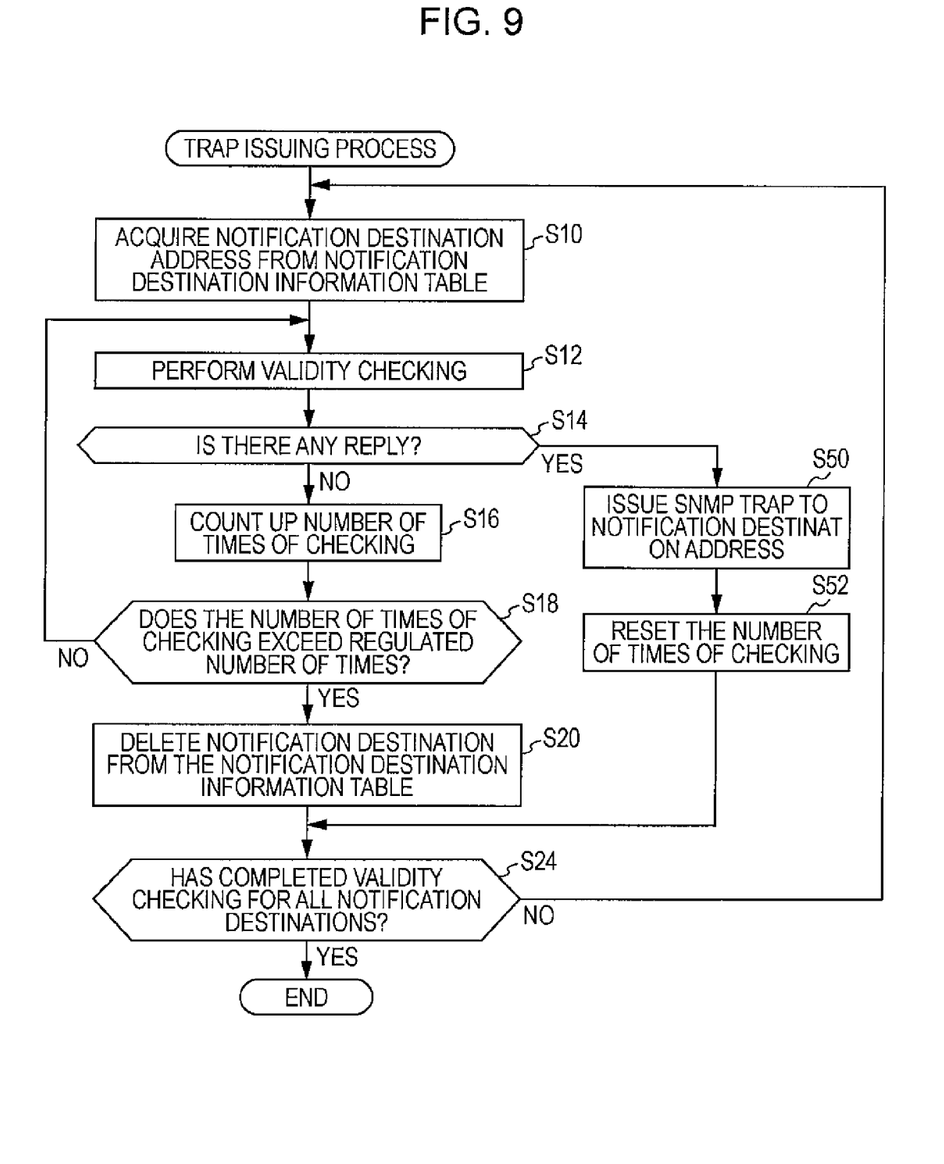
FIG. 9 is a flowchart showing the contents of a trap issuing process that is performed by a printer according to a third embodiment of the invention.

FIG. 9 is a flowchart showing the contents of a trap issuing process according to this embodiment. This trap issuing process is a process that is performed by the notification destination validity checking function unit 38, same as in the above-described first embodiment. However, in this embodiment, this trap issuing process is not operated on a regular basis as in the first embodiment but is operated when the SNMP Trap is issued.

As shown in FIG. 9, in the trap issuing process according to this embodiment, the contents of processes of Steps S10 to S20 and Step S24 are the same as those according to the above-described first embodiment. However, a process that is performed when the reply for the validity checking is received in Step S14 is different from that of the first embodiment.

Figure 10:
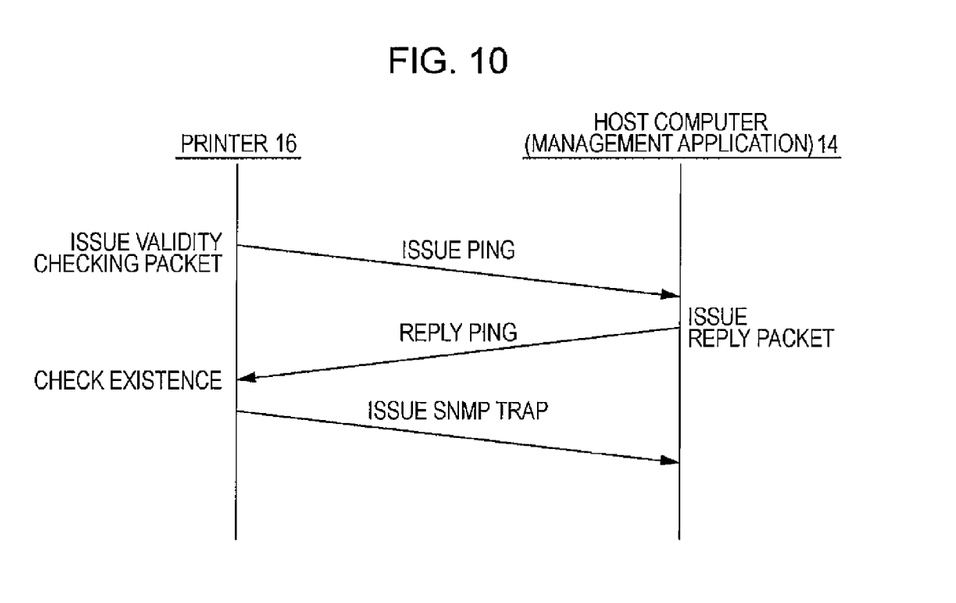
FIG. 10 a diagram showing an example of exchange between the printer and a host computer in a case where the printer issues Ping and acquires a reply for Ping from the host computer in the trap issuing process shown in FIG. 9.

In other words, according to this embodiment, when the reply for the validity checking is received (Step S14: YES), the notification destination validity checking function unit 38 issues an SNMP Trap to the notification destination address acquired in Step S10 through a status notifying function unit 34 (Step S50). In other words, as shown in FIG. 10, the status notifying function unit 34 is operated so as to issue an SNMP Trap to the notification destination from which the reply for a Ping has been received. However, depending on the type of the status change occurring in the printer 16, there may be a notification destination that is set not to be notified of the status change. To the notification destination to which the occurring status change is not the type to be notified, the SNMP Trap is not issued. Thereafter, the notification destination validity checking function unit 38 resets the number of times of the checking to zero (Step S52).

After this Step S52 or Step S20, the notification destination validity checking function unit 38 determines whether validity of all the notification destinations registered in the notification destination information table 30 has been checked, as in the above-described first embodiment (Step S24). When checking for the validity of all the notification destinations has not been completed (Step S24: NO), the process proceeds back to the above-described Step S10. Then, the notification destination address of the next notification destination is acquired from the notification destination information table 30, and validity of the next notification destination is checked. On the other hand, when checking for the validity of all the notification, destinations registered in the notification destination information table 30 is completed (Step S24: YES), this regular validity checking process is completed.

As described above, also in the device network system 10 according to this embodiment, the validity checking process is performed for the host computers 14 that are registered in the notification destination information table 30 on a regular basis, and the notification destination address of the host computer 14 from which any reply is not received is deleted from the notification destination information table 30. Accordingly, it can be avoided that the notification destination is maintained to be registered in the notification destination information table 30 despite that the notification destination does not exist with validity on the device network system 10. Therefore, by deleting the unnecessary notification destination from the notification destination information table 30, occurrence of a case can be avoided as much as possible where there is no empty place in the notification destination information table 30 and registration cannot be made at a time when there is a registration request from a new host computer 14.

In addition, the validity of the notification destination registered in the notification destination information table 30 is configured to be checked in accordance with a time when the SNMP Trap is issued. Accordingly, management for starting the validity checking process on a regular basis is not needed.

Modified Examples of First to Third Embodiments

In the device network systems 10 of the above-described first to third embodiments, the notification destination information table 30 is configured to be maintained and managed by the printer 16. However, it may be configured that a proxy server is provided in the device network system 10, and the notification destination information table 30 is maintained and managed by the proxy server.

Figure 11:
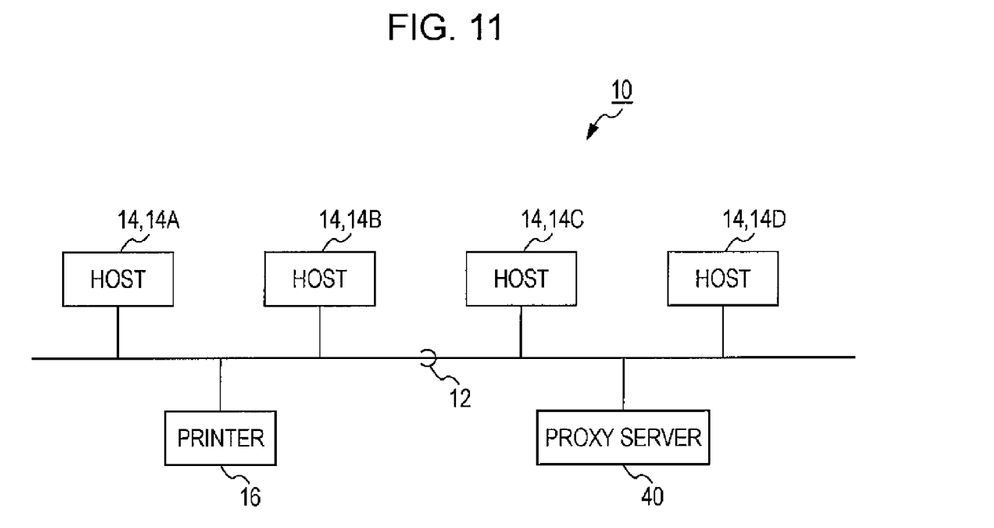
FIG. 11 is a block diagram showing an example of the network configuration for a case where a proxy server is added to the device network system shown in FIG. 1.

FIG. 11 is a block diagram showing an example of the configuration of the entire system in a case where a proxy server 40 is provided in the device network system 10. As shown in FIG. 11, the proxy server 40 is connected to a network 12 and manages the network 12. In this embodiment, this proxy server 40 manages issuance of traps. In addition, since the above-described device status notification device is installed to the proxy server 40, the proxy server 40 manages the notification destination information table 30. Even when the device network system 10 having the above-described configuration is used, each of the above-described first to third embodiments can be implemented.

Figure 12:
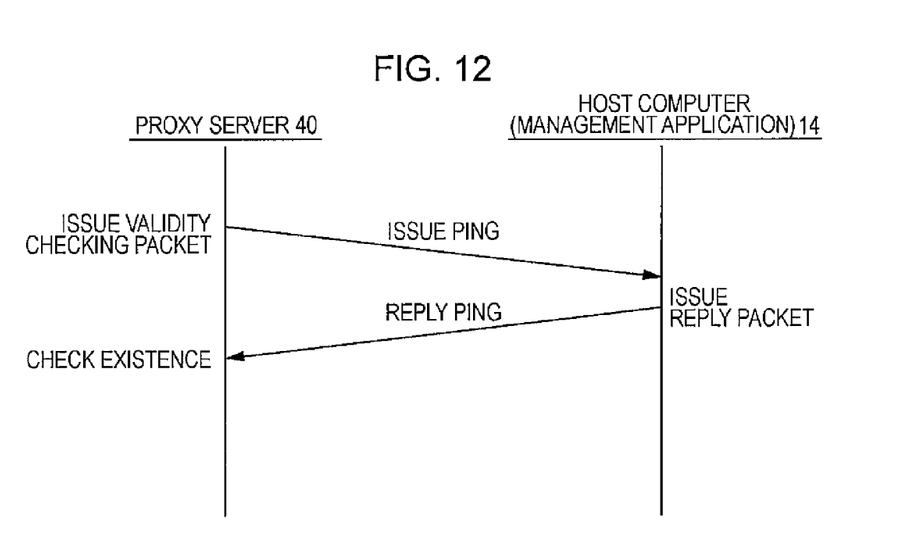
FIG. 12 is a diagram showing an example of exchange between a proxy server and a host computer for a case where the proxy server issues a Ping and acquires a reply for the Ping from the host computer in a case where the first embodiment is applied to the proxy server of the device network system shown in FIG. 11.

When the first embodiment is applied to the device network system 10 shown in FIG. 11, the proxy server 40 performs the regular validity checking process shown in FIG. 3. When the validity checking process of the above-described Step S12 is performed, as shown in FIG. 12, the proxy server 40 issues a Ping to the notification destination address acquired in Step S10. Based on whether or not a reply for the issued Ping can be acquired, the existence of the host computer 14 corresponding to the notification destination address is checked. As shown in FIG. 12, when the reply for the issued Ping can be acquired (Step S14: YES), the proxy server 40 maintains the registration in the notification destination information table 30 as it is.

Figure 13:
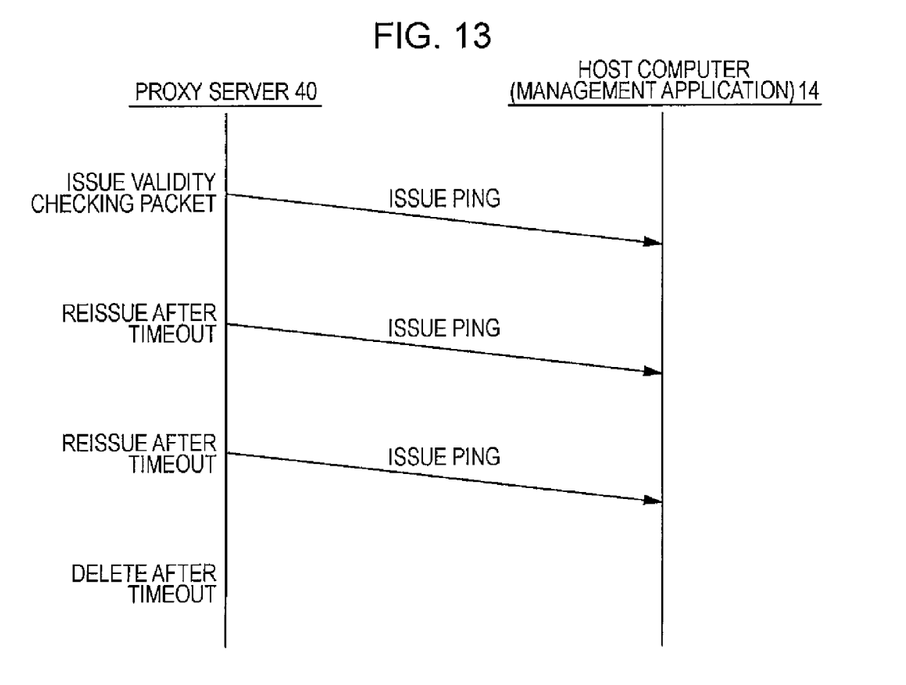
FIG. 13 is a diagram showing an example of exchange between the proxy server and the host computer for a case where the proxy server issues a Ping and cannot acquire a reply for the Ping from the host computer in a case where the first embodiment is applied to the proxy server of the device network system shown in FIG. 11.

On the other hand, as shown in FIG. 13, when any reply cannot be acquired for issuance of the Ping (Step S14: NO), the proxy server 40 consecutively repeats to issue the Ping up to the regulated number of times after occurrence of time out. According to this embodiment, the regulated number of times is three times. Accordingly, the first Ping is issued, then, when the time for the first Ping is out, the second Ping is issued. Then, when the time for the second Ping is out, the third Ping is issued. However, when the time for the third Ping is out, the proxy server 40 deletes the notification destination address from the notification destination information table 30.

In the network configuration of the device network system 10 that is shown in FIG. 11, when a status change for issuing the SNMP Trap occurs in the printer 16, the printer 16 issues the SNMP Trap to the proxy server 40. The proxy server 40 that has received this SNMP Trap acquires the notification destination address of the host computer 14 to which the status change is to be notified by searching the notification destination information table 30 and issues the SNMP Trap to each notification destination.

On the other hand, when the second embodiment is applied to the device network system 10 shown in FIG. 11, the proxy server 40 performs the regular validity checking process shown in FIG. 7. In other words, in the regular validity checking process that is operated on a regular basis, even when the proxy server 40 cannot acquire a reply (Step S34: NO) by performing the validity checking process once for each notification destination (Step S32), the proxy server 40 does not consecutively perform the validity checking process. Then, in the next regular validity checking process, validity checking is performed again, and the notification destination address is not deleted from the notification destination information table 30 until the number of times of validity checking exceeds the regulated number of times (Step S38: NO). When the number of times of checking exceeds the regulated number of times by repeating the validity checking (Step S38: YES), the notification destination address of the host computer 14 is deleted from the notification destination information table 30 (Step S40).

When the third embodiment is applied to the device network system 10 shown in FIG. 11, the proxy server 40 performs the trap issuing process shown in FIG. 9. In other words, when receiving the SNMP Trap from the printer 16, the proxy server 40 performs the trap issuing process shown in FIG. 9.

Figure 14:
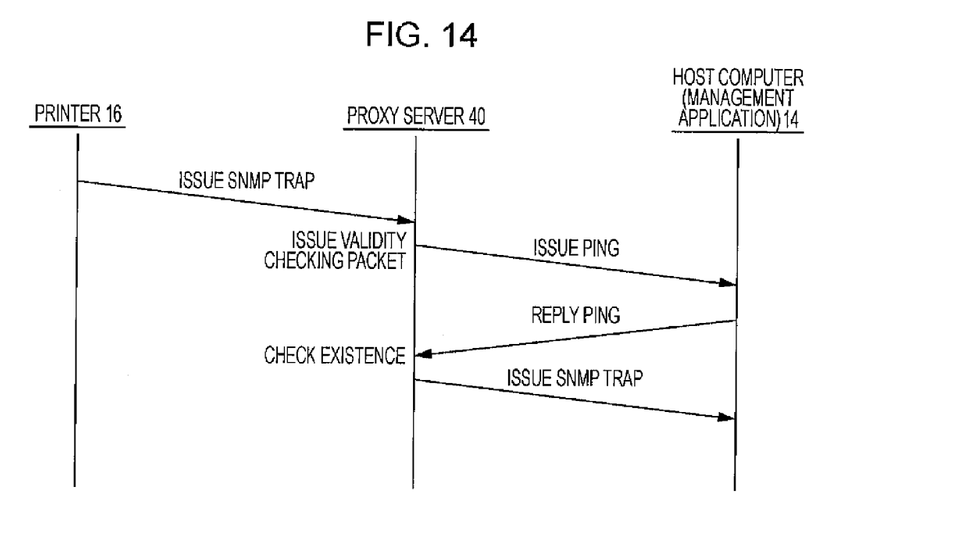
FIG. 14 is a diagram showing an example of exchange among a printer, a proxy server, and a host computer for a case where the proxy server issues a Ping and acquires a reply for the Ping from the host computer in a case where the third embodiment is applied to the proxy server of the device network system shown in FIG. 11.

In particular, in the trap issuing process shown in FIG. 9, the proxy server 40 issues a Ping to the notification destination address acquired in Step S10 (Step S12). Then, the proxy server 40 checks the existence of the host computer 14 corresponding to the notification destination address based on whether the reply for the Ping is acquired. As shown in FIG. 14, when the reply for the Ping is acquired (Step S14: Yes), the proxy server 40 issues the SNMP Trap to the notification destination (Step S50).

Figure 15:
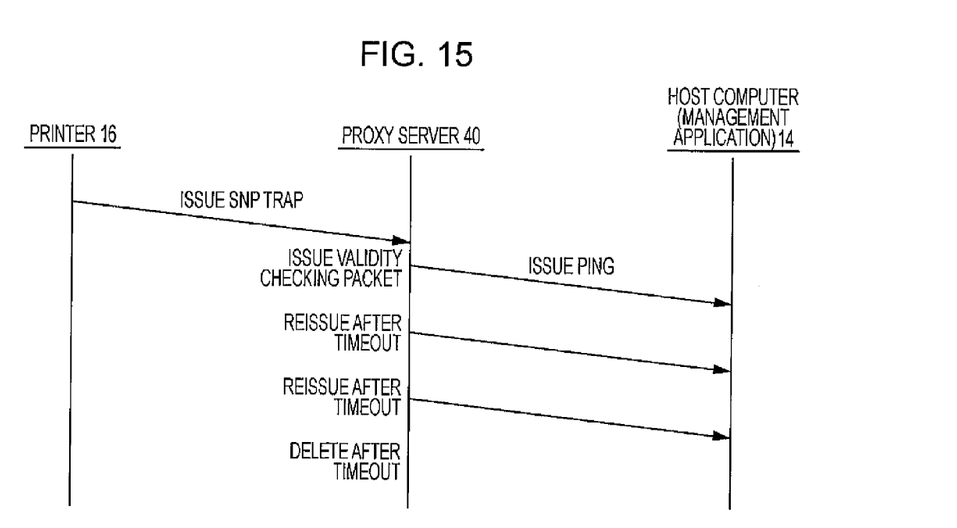
FIG. 15 is a diagram showing an example of exchange among the printer, the proxy server, and the host computer for a case where the proxy server issues a Ping and cannot acquire a reply for the Ping from the host computer in a case where the third embodiment is applied to the proxy server of the device network system shown in FIG. 11.

On the other hand, when any reply cannot be acquired for issuance of the Ping (Step S14: NO) as shown in FIG. 15, the proxy server 40 consecutively repeats to issue the Ping after the time out occurs up to the regulated number of times. According to this embodiment, the regulated number of times is three times. Accordingly, the first Ping is issued, and then, when the time for the first Ping is out, the second Ping is issued. Then, when the time for the second Ping is out, the third Ping is issued. However, when the time for the third Ping is out, the proxy server 40 deletes the notification destination address from the notification destination information table 30.

As described above, even when the proxy server 40 is used, the notification destination information table 30, which is the same as those of the above-described first to third embodiments, can be managed by the proxy server 40.

The invention is not limited to the above-described embodiments and may be changed in various forms. For example, in the above-described embodiments, the invention has been described for a case where the target of which the change in the device status is monitored is the printer 16, as an example, has been described. However, the target device of which the status change is monitored is not limited to the printer 16.

In addition, in the above-described embodiments, the invention has been described for a case where information on up to four notification destinations can be stored in the notification destination information table 30 as an example. However, the number of the notification destinations that can be stored in the notification destination information table 30 may be arbitrarily designed.

In addition, in the above-described embodiments, since the network 12 is in conformity with TCP/IP, the change in the status of the device to be monitored is notified to the host computer 14 by using the SNMP Trap. However, the above-described notification can be implemented by using different communication specifications or protocols.

In addition, in the above-described embodiments, the description has been made on the premise that one management application is generated in one host computer 14. However, a plurality of management applications may be generated in one host computer 14. In such a case, the printer 16 performs the above-described processes for each management application. In other words, the printer 16 performs the validity checking process or issuance of the SNMP Trap for each application.

The entire disclosure of Japanese Patent Application No. 2008-275228, filed Oct. 27, 2008 is expressly incorporated by reference herein.

What is claimed is:

1. A device status notification device comprising a non-transitory computer-readable medium encoded with instructions for notifying a notification destination, which is connected to a network, of a status change in a device connected to the network through the network, and further comprising:
   a notification destination information table in which a notification destination, to which the status change in the device is notified in a case where there is the status change in the device, is registered;
   a notification destination validity checking unit that checks whether the notification destination registered in the notification destination information table exists with validity; and
   a registration deleting unit that deletes the notification destination, of which valid existence cannot be checked by the notification destination validity checking unit, from the notification destination information table, wherein
   the notification destination validity checking unit checks whether the notification destination registered in the notification destination information table exists with validity at predetermined time intervals, and
   the notification destination validity checking unit issues the reply request up to a regulated number of times to the notification destination in a case where the reply from the notification destination cannot be acquired for the issuing of the reply request and determines that the notification destination, from which the reply cannot be acquired for the issuing of the reply request exceeding the regulated number of times, does not exist with validity.

2. The device status notification device according to claim 1, wherein the notification destination validity checking unit determines that the notification destination does not exist with validity in a case where the notification destination validity checking unit issues a reply request for requesting a reply to the notification destination registered in the notification destination information table and cannot acquire the reply for the reply request.

3. The device status notification device according to claim 1, wherein the notification destination validity checking unit checks whether the notification destination registered in the notification destination information table exists with validity when notifying of the status change in the device.

4. A device status notification device comprising a non-transitory computer-readable medium encoded with instructions for notifying a notification destination, which is connected to a network, of a status change in a device connected to the network through the network, and further comprising:
   a notification destination information table in which a notification destination, to which the status change in the device is notified in a case where there is the status change in the device, is registered;
   a notification destination validity checking unit that checks whether the notification destination registered in the notification destination information table exists with validity; and
   a registration deleting unit that deletes the notification destination, of which valid existence cannot be checked by the notification destination validity checking unit, from the notification destination information table, wherein
   the notification destination validity checking unit checks whether the notification destination registered in the notification destination information table exists with validity at predetermined time intervals,
   the notification destination validity checking unit does not consecutively issue the next reply request and counts up the number of times of checking when the reply cannot be acquired after elapse of a predetermined time from issuing of the reply request to the notification destination, and
   the registration deleting unit deletes the notification destination from the notification destination information table in a case where the number of times of the checking exceeds a regulated number of times.

5. The device status notification device according to claim 1, wherein the device status notification device is arranged in the device of which the status change is monitored.

6. The device status notification device according to claim 1, wherein the device status notification device is a proxy server and is connected to the device of which the status change is monitored through the network.

* * * * *